United States Patent
Yu et al.

(10) Patent No.: US 10,353,234 B2
(45) Date of Patent: *Jul. 16, 2019

(54) LIQUID CRYSTAL DISPLAY HAVING AN OPENING IN A LIGHT SHIELDING PATTERN AND METHOD OF MANUFACTURING THE SAME

(71) Applicant: Samsung Display Co., Ltd., Yongin-Si, Gyeonggi-Do (KR)

(72) Inventors: Sang Hee Yu, Hwaseong-si (KR); Byung Chul Kim, Asan-si (KR); Won Gap Yoon, Suwon-si (KR); Jae Hong Park, Seoul (KR); Young Joo Jeon, Seoul (KR); Kyung Seon Tak, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/155,626

(22) Filed: Oct. 9, 2018

(65) Prior Publication Data

US 2019/0041688 A1     Feb. 7, 2019

Related U.S. Application Data

(63) Continuation of application No. 15/881,499, filed on Jan. 26, 2018, now Pat. No. 10,126,586, which is a
(Continued)

(30) Foreign Application Priority Data

Aug. 21, 2015 (KR) .................... 10-2015-0117865

(51) Int. Cl.
*G02F 1/1339* (2006.01)
*G02F 1/1337* (2006.01)
(Continued)

(52) U.S. Cl.
CPC ...... *G02F 1/133512* (2013.01); *G02F 1/1337* (2013.01); *G02F 1/1339* (2013.01);
(Continued)

(58) Field of Classification Search
CPC .......... G02F 1/133512; G02F 1/13394; G02F 1/1337; G02F 1/1339; G02F 2001/13398
See application file for complete search history.

(56) References Cited

U.S. PATENT DOCUMENTS 6,120,858 A       9/2000  Hirano et al.
10,126,586 B2 *  11/2018  Yu ........................ H05K 999/99
(Continued)

*Primary Examiner* — Tracie Y Green
(74) *Attorney, Agent, or Firm* — Innovation Counsel LLP

(57) ABSTRACT

A liquid crystal display is provided. A liquid crystal display comprising a first substrate which comprises a display area and a non-display area, a second substrate which faces the first substrate, a sealing member which is disposed in the non-display area between the first substrate and the second substrate, wherein the first substrate comprises a light-shielding pattern, a column spacer which is protruded from the light-shielding pattern toward the second substrate to maintain an interval between the first substrate and the second substrate, an opening which is disposed in the light-shielding pattern, and overlapping the sealing member.

16 Claims, 21 Drawing Sheets

Related U.S. Application Data continuation of application No. 15/045,088, filed on Feb. 16, 2016, now Pat. No. 9,910,312.

(51) Int. Cl.
 *G02F 1/1333* (2006.01)
 *G02F 1/1335* (2006.01)

(52) U.S. Cl.
 CPC ....... *G02F 1/13394* (2013.01); *H05K 999/99* (2013.01); *G02F 2001/13398* (2013.01)

(56) References Cited

U.S. PATENT DOCUMENTS

| | | |
|---|---|---|
| 2007/0247582 A1 | 10/2007 | Mochizuki |
| 2007/0291216 A1 | 12/2007 | Chan et al. |
| 2013/0169913 A1 | 7/2013 | Choi et al. |
| 2014/0147659 A1 | 5/2014 | Chun et al. |

* cited by examiner

LIQUID CRYSTAL DISPLAY HAVING AN OPENING IN A LIGHT SHIELDING PATTERN AND METHOD OF MANUFACTURING THE SAME

CROSS-REFERENCE TO RELATED APPLICATION(S)

This application is a continuation application of U.S. patent application Ser. No. 15/881,499 filed on Jan. 26, 2018, which is a continuation application of U.S. patent application Ser. No. 15/045,088 filed on Feb. 16, 2018 (now U.S. Pat. No. 9,910,312), which claims priority to Korean Patent Application No. 10-2015-0117865 filed on Aug. 21, 2015 in the Korean Intellectual Property Office, the disclosure of which is incorporated herein by reference in its entirety.

BACKGROUND

1. Field

The present inventive concept relates to a liquid crystal display (LCD) and method of manufacturing the same.

2. Description of the Related Art

A display is a device which visually displays images. The display includes a liquid crystal display, an electrophoretic display, an organic light emitting display, an inorganic electro luminescent display, a field emission display, a surface-conduction electron-emitter display, a plasma display and a cathode ray display.

Among them, the liquid crystal display is one of the most widely used displays. The liquid crystal display generally includes an array substrate, a counter substrate facing the array substrate, and a liquid crystal layer interposed between the array substrate and the counter substrate. Recently, a liquid crystal display of a high-transmission structure has been developed which adopts a color-filter on array (COA) in which a color filter is formed on the array substrate. In this case, an alignment failure may occur in a coupling process of the COA substrate and the counter substrate formed with a light-shielding pattern. In order to prevent the alignment failure, a black matrix on array (BOA) substrate in which a light-shielding pattern is formed on the COA substrate has been developed, and a black column spacer (BCS) in which column spacers for maintaining an interval between the light-shielding pattern and the substrate are simultaneously formed of the same material has been developed.

Meanwhile, when a black sealing material is applied on a black column spacer (BCS) in which the column spacers for maintaining an interval between the light-shielding pattern and the substrate are simultaneously formed of the same material, it is not possible to measure the disconnection or abnormal pattern of the black sealing material using the existing sealing inspection device, which may act as a disadvantageous factor.

SUMMARY

An aspect of the present inventive concept provides a display that is advantageous for sealing inspection by further including an opening on a light-shielding holding member.

Another aspect of the present inventive concept provides a sealing inspection method capable of inspecting the presence or absence of abnormality of the sealing area, even when applying the black sealing material on the light-shielding holding member.

According to an aspect of the present inventive concept, there is provided a liquid crystal display includes a first substrate including a display area and a non-display area, a second substrate facing the first substrate, and a sealing member disposed in the non-display area between the first substrate and the second substrate, wherein the first substrate includes a light-shielding pattern, a column spacer which is protruded from the light-shielding pattern toward the second substrate to maintain an interval between the first substrate and the second substrate, and an opening which is disposed in the light-shielding pattern, and overlapping the sealing member.

Here, the opening may extend in a thickness direction of the light-shielding pattern, and depth of the opening may be the same as the thickness of the light-shielding pattern.

Furthermore, the non-display area includes a light-shielding area in which the sealing member is not disposed, and a sealing area having a shape of a closed curve which surrounds the light-shielding area, and the opening may be disposed in the sealing area.

Moreover, the opening may include a plurality of openings which have a regularly spaced interval.

The opening may have a same shape and a same size.

The light-shielding pattern overlapping the sealing area may have a thickness thinner than that of the light-shielding pattern disposed in the light-shielding area.

The light-shielding pattern may have an inclined surface between the sealing area and the light-shielding area.

Further, the interior of the opening may be completely filled with the sealing member.

At this time, a dummy wiring may be further included at the bottom of the light-shielding pattern disposed on the sealing area.

Furthermore, the dummy wiring may be extension of the wiring disposed on the display area.

In addition, the wiring of the dummy wiring disposed on the display area may have a disconnected portion at a boundary between the non-display area and the display area.

In addition, an upper portion of the opening may be wider than a lower portion of the opening, and the opening may have an inclined surface between the upper portion and the lower portion.

Moreover, the opening may include at least one or more openings having shapes different from each other.

The height of the sealing member may be higher than the height of the column spacer and an alignment layer may be disposed between the sealing member and the light-shielding pattern.

Furthermore, the light-shielding pattern, the column spacer and the sealing member may be made of a black material.

In addition, the light-shielding pattern and the column spacer may be photosensitive materials and formed of a same material through a same process, and the sealing member may be formed of a non-photosensitive material.

According to another aspect of the present inventive concept, there is provided a method of manufacturing a liquid crystal display includes: forming a light-shielding member on a first substrate; forming an opening in the light-shielding member; forming a sealing member on the opening of the light-shielding member; projecting an external light source onto the sealing member; and determining whether the sealing member is normally formed, using the light emitted from the light source.

Here, determining whether the sealing member is normally distributed using the light emitted from the light source may include measuring reflected light, and determining whether the measured reflected light is light reflected by the sealing member or light reflected by a layer below the sealing member exposed by the opening.

The method further includes estimating a position of the measured light when the measured light is determined as light reflected from the layer below the sealing member exposed by the opening, and forming an additional sealing member at the estimated position.

The method may further include combining a second substrate to face the first substrate, when the sealing member is determined to be normally formed.

The display according to an embodiment of the present inventive concept may inspect the presence or absence of abnormality of the sealing member of the sealing area, by analyzing the light reflected by the sealing area of the display.

The display according to another embodiment of the present inventive concept may provide a display which is advantageous for inspecting the presence or absence of abnormality of the black sealing material disposed on the light-shielding holding member in the sealing area of the display.

Effects according to the embodiments of the present inventive concept are not limited by the contents illustrated above, and furthermore various effects are included herein.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION

Figure 1:
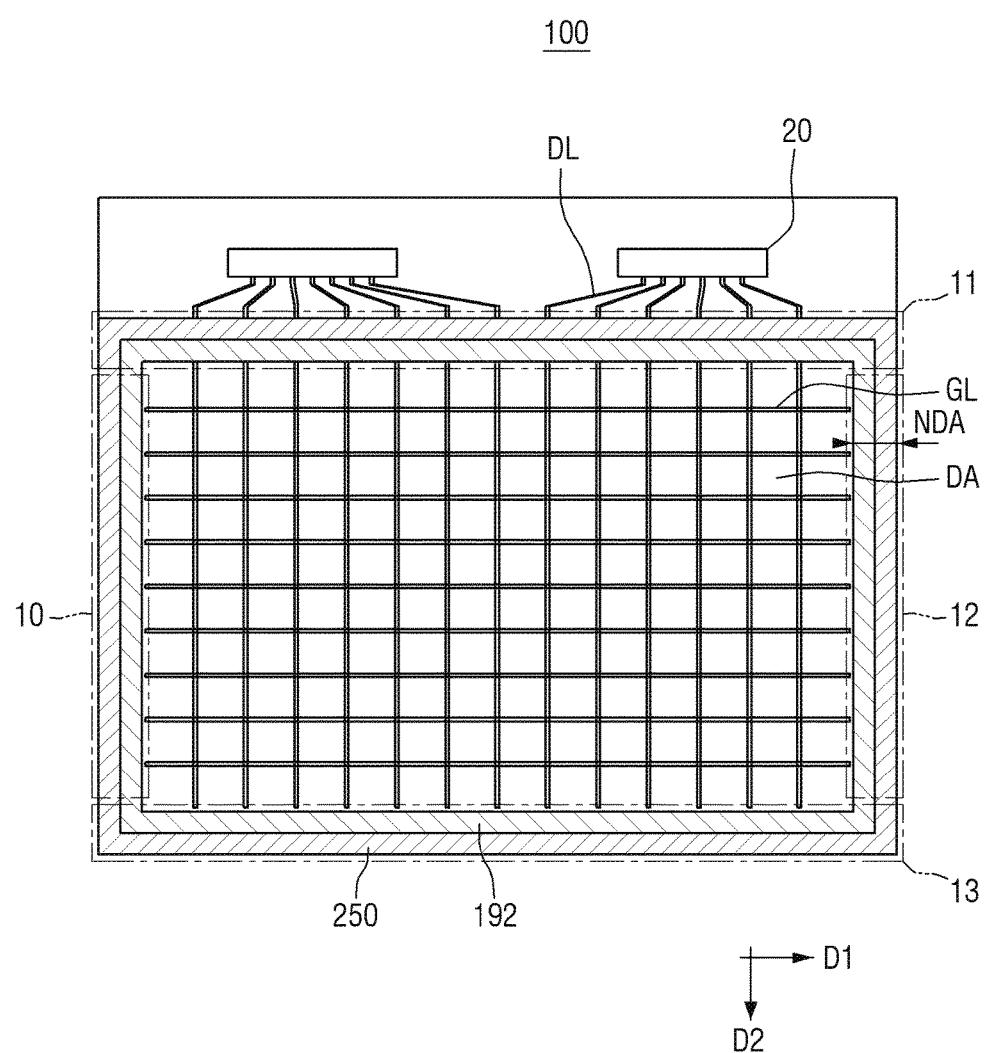
FIG. 1 is a schematic plan view of a first substrate of a liquid crystal display according to an embodiment of the present inventive concept.

FIG. 1 is a schematic plan view of a first display substrate of a liquid crystal display according to an embodiment of the present inventive concept.

Referring to FIG. 1, a first substrate 100 of the liquid crystal display according to an embodiment of the present inventive concept includes a display area DA, and a non-display area NDA disposed on the periphery of the display area DA. A plurality of pixels are disposed in the display area DA. The plurality of pixels may be arranged in a matrix shape.

In the non-display area NDA of the first substrate 100, a data drive unit which provides a data drive signal to the display area DA side, and a gate drive unit which provides a gate drive signal may be disposed.

The data drive unit may receive video signals and data control signal from a timing controller. The data drive unit may generate analog data voltages which correspond to the video signals, in response to the data control signal. The data drive unit may provide the data voltage to each pixel through data lines DL.

The data drive unit may include at least one data drive chip 20. The data drive chip 20 may be connected to a corresponding data pad unit in the non-display area NDA. The data drive chip 20 may be mounted in the non-display area NDA of the first substrate 100 in a chip-on-glass method.

The gate drive unit may provide a gate signal to each pixel through a gate line GL. The gate drive unit may be directly formed on the non-display area NDA, rather than being provided in the form of IC chips. However, it is not limited thereto, and the gate drive unit may also be mounted on the non-display area NDA in the form of an IC chip.

A sealing member 250 may be applied to a portion bonded to a second display substrate (not illustrated) on the first substrate 100. The sealing member 250 is disposed along the non-display area NDA which is an outline of the display area DA, and may form a closed curve such as a rectangle in the plane view. Detailed description of the first substrate 100 and the sealing member 250 will be provided later.

Figure 2:
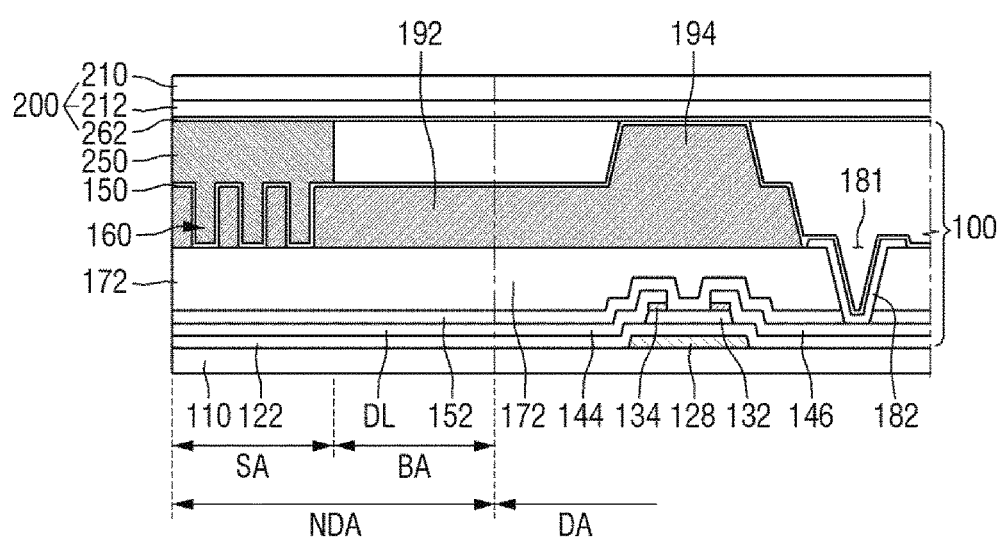
FIG. 2 is a schematic cross-sectional view of the liquid crystal display according to an embodiment of the present inventive concept.

Hereinafter, a sectional structure of the above-described liquid crystal display will be described. FIG. 2 is a cross-sectional view of a liquid crystal display according to an embodiment of the present inventive concept.

First, a cross-sectional structure of the display area of the liquid crystal display DA will be described.

Referring to FIG. 2, the first substrate 100 includes a first base substrate 110. The first base substrate 110 may include an insulating material such as transparent glass, quartz, ceramics, silicon or transparent plastic.

A plurality of gate lines (GL) which includes a plurality of gate electrodes 128 and a plurality of data lines (DL) may be disposed on the first base substrate 110.

The gate line (GL) may include a plurality of gate lines GL, and a plurality of gate electrodes 128. The data lines (DL) may include a plurality of data lines DL, a plurality of source electrodes 144, and a plurality of drain electrodes 146.

The gate lines (GL) and the data lines (DL) may be formed of an aluminum-based metal such as aluminum (Al) and aluminum alloy, a silver-based metal such as silver (Ag) and silver alloy, a copper-based metal such as copper (Cu) and copper alloy, a molybdenum-based metal such as molybdenum (Mo) and molybdenum alloy, chromium (Cr), titanium (Ti) and tantalum Ta.

Each gate line GL may extend in a D1 direction, e.g., in a horizontal direction along the boundary of the pixels, and each of the data lines DL may extend in a D2 direction, e.g., a vertical direction along the boundary of the pixels. The gate line GL and the data line DL may be define a pixel region.

At least one gate electrode 128 is connected and disposed for each pixel in each gate line GL. The gate electrode 128 may overlap the semiconductor layer 132 or may be formed by extension of the gate line GL, but it is not limited thereto.

At least one source electrode 144 is connected and disposed for each pixel in each data line DL. The source electrode 144 may overlap the semiconductor layer 132, or may be formed by extension of the data line DL. However, it is not limited thereto.

The drain electrode 146 may be disposed to be spaced apart from the source electrode 144 with a channel region interposed therebetween on the semiconductor layer 132, and may be electrically connected to the pixel electrode 182 through a contact hole 181 formed in a protective layer 152 and an organic layer 172.

A gate insulating film 122 may be disposed between the gate electrode 128 and the source electrode 144 and the drain electrode 146. In an embodiment, the gate insulating film 122 is disposed on the gate line (GL) and the data lines (DL). The gate insulating film 122, for example, may be formed of silicon nitride (SiNx), silicon oxide (SiO2), silicon oxynitride (SiON) or a laminated film thereof. The gate insulating film 122 may serve to maintain insulation between conductive thin films, such as the gate line (GL) and the data line (DL) located at the top thereof.

The semiconductor layer 132 is disposed on the gate insulating film 122, and for example, may be formed of hydrogenated amorphous silicon or polycrystalline silicon. The semiconductor layer 132 is disposed to at least partially overlap the gate electrode 128. The semiconductor layer 132 constitutes a thin film transistor, together with the gate electrode 128, the source electrode 144 and the drain electrode 146.

The semiconductor layer 132 may have various shapes such as an island shape or a linear shape, and FIG. 2 illustrates a case where the semiconductor layer 132 is formed in an island shape, but it is not limited thereto. When the semiconductor layer 132 is formed in a linear shape, although it is not separately illustrated, the semiconductor layer 132 may overlap the data lines (DL).

Ohmic contact layers 134 formed of n+ hydrogenated amorphous silicon doped with n-type impurity at a high concentration may be disposed on the semiconductor layer 132. The ohmic contact layers 134 are located among the lower semiconductor layer 132, the upper source electrode 144 and the drain electrode 146 to serve to reduce the contact resistance. The ohmic contact layers 134 may have various shapes such as an island shape and a linear shape, similarly to the semiconductor layer 132. When the semiconductor layer 132 has an island shape, the ohmic contact layers 134 may also have an island shape, and when the semiconductor layer 132 has a linear shape, the ohmic contact layers 134 may also have a linear shape. Unlike the semiconductor layer 132, the ohmic contact layers 134 is spaced apart from each other to face each other with the channel region interposed therebetween, and thus, the lower semiconductor layer 132 in the channel region may be exposed. A channel may be formed in a region of the semiconductor layer 132 in which the source electrode 144 and the drain electrode 146 are spaced from each other while facing. When a gate-on signal is applied to the gate electrode 128 and a channel is formed in the semiconductor layer 132, a thin film transistor is turned on, and the drain electrode 146 may receive the data signal from the source electrode 144 and may transmit the date signal to the pixel electrode 182.

A protective layer (passivation layer) 152 is disposed on the data lines (DL) and the exposed semiconductor layer 132. A contact hole 181 which exposes at least a portion of the drain electrode 146 may be formed in the protective layer 152 and an organic layer 172 which will be described later. At least a part of the drain electrode 146 exposed through the contact hole 181 may come into contact with the pixel electrode 182. Thus, the drain electrode 146 and the pixel electrode 182 may be electrically connected to each other. The protective layer 152, for example, may include inorganic materials such as silicon nitride or silicon oxide, materials such as a-Si:C:O and a-Si:O:F formed by a plasma enhanced chemical vapor deposition (PECVD).

The organic layer 172 may be disposed on the protective layer 152. The organic layer 172 may have a material which has excellent planarization characteristics and photosensitivity. The organic layer 172 may include a contact hole 181 which exposes at least a part of the drain electrode 136.

The pixel electrode 182 may be disposed for each unit pixel on the organic layer 172. Some of the pixel electrodes 182 are disposed inside the contact hole 181. Some of the pixel electrodes 182 disposed inside the contact hole 181 may be in contact with the drain electrode 146 and may be electrically connected to the drain electrode 146.

A light-shielding pattern 192 may be disposed on the organic layer 172 and the pixel electrode 182. The light-shielding pattern 192 serves to prevent the light leakage. The light-shielding pattern 192 may be disposed in the thin film transistor region and the non-pixel region (between the pixels, the gate line and the data line region).

The light-shielding pattern 192 may be formed to include a black organic polymeric material which contains a black dye or pigment, and a metal (metal oxide) such as chromium and chromium oxide.

A column spacer 194 maintains an interval between the first substrate 100 and the second display substrate 200, and in some embodiments, end portions of the column spacer 194 may be in contact with the second display substrate 200 side, as illustrated in FIG. 2. However, this is an example, and the end portions of the column spacer 194 may be formed to be spaced apart from the second display substrate 200 by a predetermined distance.

Although it is not illustrated, the column spacer 194 may be embodied to include a plurality of column spacers with different heights. For example, the column spacer 194 may include a main column spacer having a relatively high height, and a sub column spacer having a relatively low height.

The column spacer 194 may be formed in a region corresponding to the thin film transistor. The light-shielding pattern 192 and the column spacer 194 according to an embodiment of the present inventive concept may be formed of the same material through the same manufacturing process. The light-shielding pattern 192 and the column spacer 194, for example, may be formed of black pigment and the acrylic polymer-based material. The light-shielding pattern 192 and the column spacer 194 may further include a photosensitive material.

The light-shielding pattern 192 is also disposed on the non-display area NDA of the first substrate 100. For example, the light-shielding pattern 192 may be disposed to cover all the frame portions of the liquid crystal display.

The sealing member 250 may be disposed on a partial region of the light-shielding pattern 192 in the non-display area NDA. The sealing member 250 is made of an acrylic (methcrylic) polymer material, and may be formed to include black pigment, similarly to the light-shielding pattern 192. The sealing member 250 may further include silica and filler. The sealing member 250 may exhibit a black color, generally similarly to the light-shielding pattern 192.

The non-display area NDA may include a light-shielding area BA and a sealing area SA. The light-shielding area BA and the sealing area SA are classified, based on whether the sealing member 250 is formed. Specifically, the sealing area SA is a region in which the light-shielding pattern 192 and the sealing member 250 are formed, and the light-shielding area BA is a region in which only the light-shielding pattern 192 is formed without a sealing member 250. The sealing area SA may be located outside the light-shielding area BA.

The light-shielding pattern 192 of the sealing area SA includes openings 160. A plurality of openings 160 of the light-shielding pattern 192 may be provided. The openings of the light-shielding pattern 192 may be formed to penetrate the light-shielding pattern 192 in the thickness direction, thereby exposing a lower structure, e.g., the organic film 172. The sealing member 250 is located at the upper end of the openings 160 of the light-shielding pattern 192 and may be filled in the openings.

The openings formed in the light-shielding pattern 192 in the sealing area SA may be utilized to determine whether there is a sealing failure. For example, the sealing inspection is performed to determine whether the width of the sealing member 250 is correct as designed and the sealing member 250 is not disconnected, after applying the sealing member 250 onto the light-shielding pattern 192. At this time, when the sealing member 250 and the light-shielding pattern 192 are formed of the same black material, the inspection is not easy. Thus, by forming the opening in the light-shielding pattern 192, it is possible to easily determine whether or not there is a defect in the sealing member 250. The detailed description thereof will be provided later.

An alignment film 150 may be disposed on the light-shielding pattern 192 and the column spacer 194. The alignment film 150 may include a resin polymer such as polyimide, polyamic acid, polyamide, polyamic imide, polyester, polyethylene, polyurethane or polystyrene, or a mixture thereof so that a liquid crystal layer may be aligned later. Further, the alignment film 150 may be embodied to include a monomer of the resin polymer.

The second substrate 200 includes a second display substrate 210. The second display substrate 210 may be an insulation substrate, and the second display substrate 210 may be disposed to face the first display substrate 110.

A common electrode 212 may be disposed on the second substrate 210. The common electrode 212 may control the alignment direction of liquid crystal molecules contained in the liquid crystal layer, by receiving application of the common voltage and by forming an electric field together with the pixel electrode 182. An alignment film 262 may also be disposed on the common electrode 212, and the alignment film may be embodied to include a monomer of the resin polymer.

In the process of manufacturing a general liquid crystal display, after manufacturing each of the first substrate 100 and the second substrate 210, the sealing member 250 is applied onto the sealing area SA of the first substrate 100, the second substrate 210 is bound to the sealing member, and thereafter, they are cured by irradiation of UV beam. At this time, a thermal curing may be further included.

In the manufacturing process of the liquid crystal display of the present inventive concept, after applying the sealing member 250 onto the sealing area SA of the first substrate 100, the sealing inspection is performed. When the failure of the sealing member 250 is found during the sealing inspection, a repair process may be further included. The repair process may include additionally applying the sealing member 250 to a portion in which the width of the sealing member 250 is thinner than a reference value or the sealing member 250 is disconnected, but it is not limited thereto.

After performing the sealing inspection of the sealing member 250, after the sealing is determined to be normally applied, by bonding the sealing member with the second substrate, and the UV curing and the thermal curing may be performed.

Figure 3:
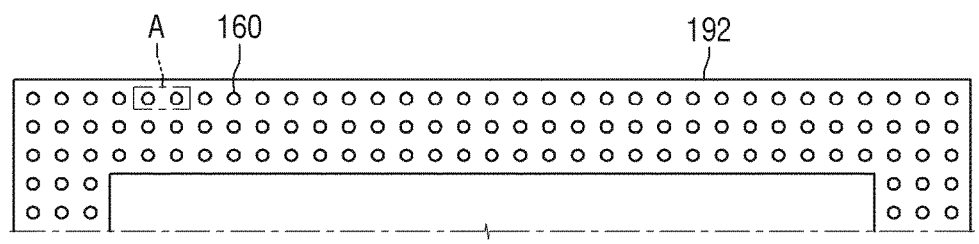
FIG. 3 is an enlarged view of only a light-shielding pattern 192 disposed in a second region 11 of FIG. 1 according to an embodiment of the present inventive concept.
Figure 4:
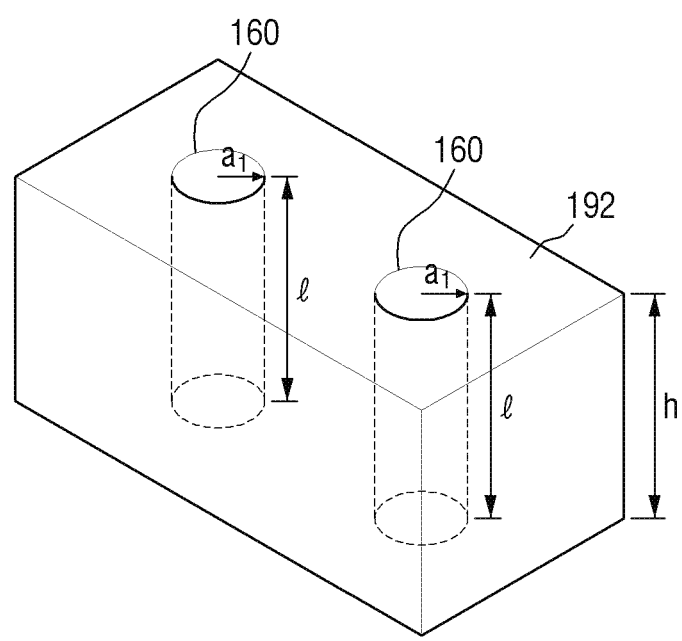
FIG. 4 is an enlarged perspective view of a part A of FIG. 3 illustrating a first opening 160.

FIG. 3 is an enlarged view separately illustrating only the light-shielding pattern 192 layer disposed on the second region 11 of the FIG. 1. FIG. 4 is an enlarged perspective view illustrating only a part A of FIG. 3.

Referring to FIGS. 3 and 4, the shape and structure of the first opening 160 disposed in the light-shielding pattern 192 according to an embodiment of the present inventive concept will be described.

The first opening 160 has a cylindrical shape having a size of a radius $a_1$, and may have a hole shape in which the light-shielding pattern 192 is removed within the light-shielding pattern 192. Thus, a cylindrical height 1 of the first opening 160 is the same as the thickness h of the light-shielding pattern 192, and the first opening 160 may also be manufactured together, by the exposure and development process, when forming the light-shielding pattern 192.

The first opening 160 may expose the organic layer 172 disposed on the bottom of the light-shielding pattern 192 by the removal of the light-shielding pattern 192. The alignment film 150 is disposed on the first opening 160, and thereafter, the sealing member 250 is applied. The sealing member 250 needs to bury all the sealing area SA to prevent an occurrence of failure in the bonding of first substrate 100 and the second substrate 200. Thus, if there is a portion in which the sealing member 250 is not applied as intended, for example, the sealing member 250 is not filled in the opening 160, since the interior of the first opening 160 still exposes the organic layer 172, light reflected from the organic layer 172 during the sealing inspection is detected, and a sealing failure may be detected.

In order to detect the position where the sealing member 250 is abnormally applied, it is desirable that the size and interval of the first opening 160 be regular. Therefore, as illustrated in FIG. 3, a pattern having a regular radius size and a regular interval may be repeated in the sealing area, and in order to detect whether the sealing member 250 is disconnected or has a smaller width than designed, the three or more row of the first openings 160 are desirably disposed in the sealing area SA on the cross-sectional view.

Figure 5:
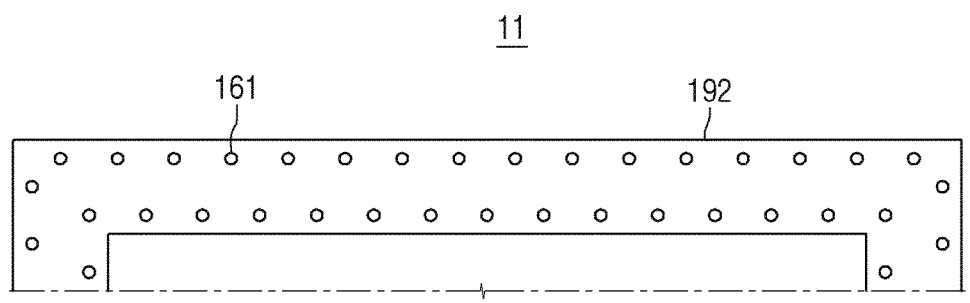
FIG. 5 is an enlarged view of only a light-shielding pattern 192 disposed in the second region 11 of FIG. 1 according to another embodiment of the present inventive concept.
Figure 6:
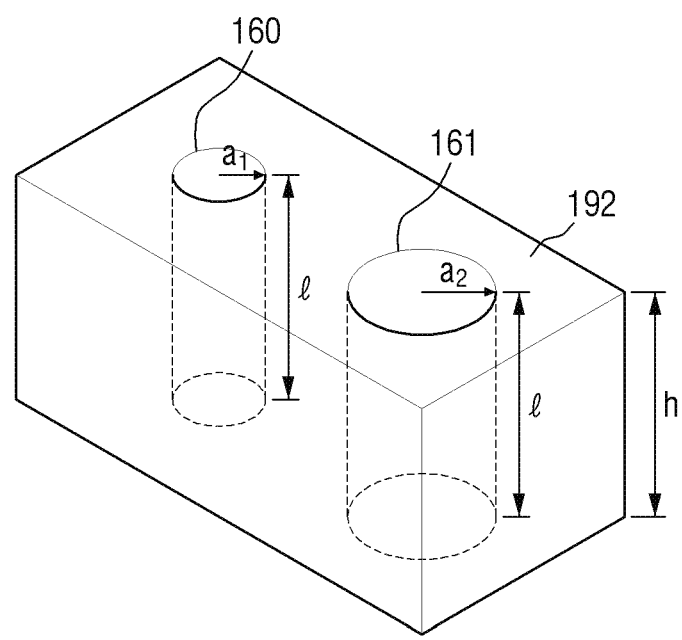
FIG. 6 is a perspective view for comparing a second opening 161 to a first opening 160 according to the embodiment of FIG. 5.

FIG. 5 is an enlarged view of only the light-shielding pattern 192 disposed on the second region 11 of the FIG. 1 according to another embodiment of the present inventive concept, and FIG. 6 is a perspective view for comparing the second opening 161 according to the embodiment of FIG. 5 with the first opening 160 according to the embodiment of FIG. 3.

The second opening 161 may have a radius size greater than that of the first opening 160. Therefore $a_2$ is larger than $a_1$. The second openings 161 are disposed along the edge of the sealing area SA. Since the hole radius of the second openings 161 is large, the second openings 161 may be alternately disposed rather than being disposed side by side in a matrix form. Since the radius of the second opening 161 is greater than that of the first opening 160, the inspection failure of the sealing member 250 having the narrowed width may be more accurately and precisely inspected.

Figure 7:
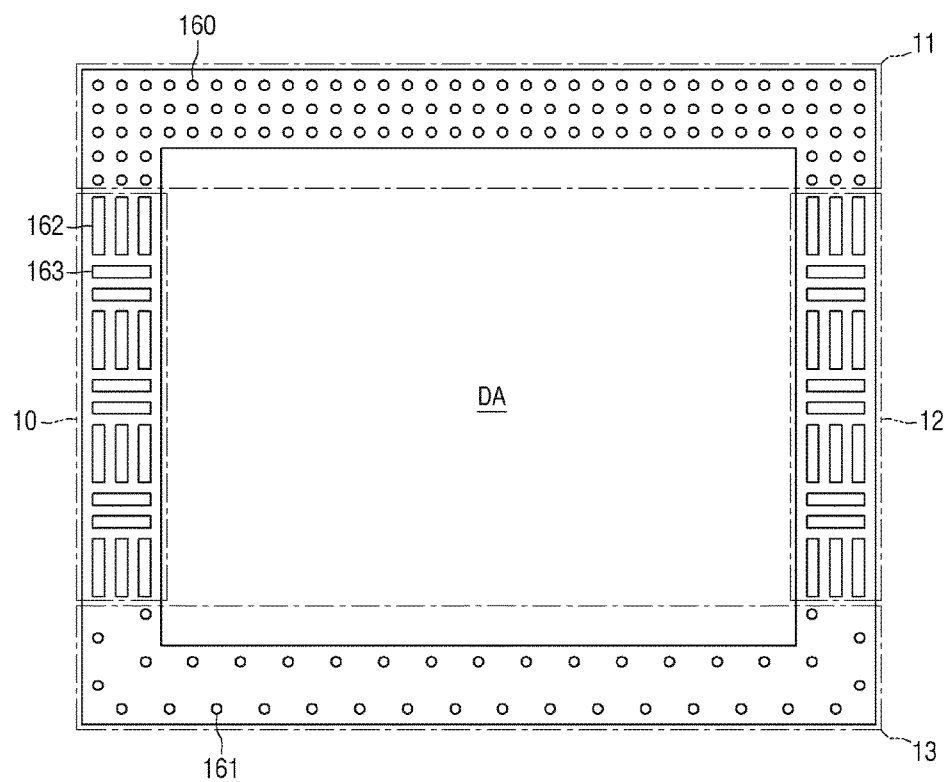
FIG. 7 is a plan view separately illustrating only light-shielding pattern 192 disposed on the first substrate 100 according to another embodiment of the present inventive concept.

FIG. 7 is a plan view separately illustrating only the light-shielding pattern 192 disposed on the first substrate 100 according to still another embodiment of the present inventive concept. Referring to FIG. 7, different openings may be included for each part of the sealing area SA. The cylindrical first openings 160 are disposed in the second region 11 of the sealing area SA in which a plurality of data lines (DL) are disposed, and the openings may be widely formed in a first region 10, a third region 12 and a fourth region 13 in which the wirings may not disposed in the sealing area SA.

In addition, in the region in which disconnections of the sealing member 250 are frequently detected, openings formed along the boundary between the sealing area SA and the light shielding area BA may be formed like a third opening 162 of FIG. 7. In the region in which many defects of the narrowed width of the sealing member 250 are detected, openings extending perpendicular to the boundary between the sealing area SA and the light shielding area BA may be included like the fourth openings 163. Therefore, the sealing area SA may have at least one of first to fourth openings 160, 161, 162, 163 in the light-shielding pattern 192. The size and shape of the opening are not limited to configurations illustrated in FIG. 7, and those skilled in the art may obviously derive the light-shielding patterns 192 having the same advantage as the embodiments of the present inventive concept from the shapes of each of the openings disclosed in FIG. 7.

Figure 8:
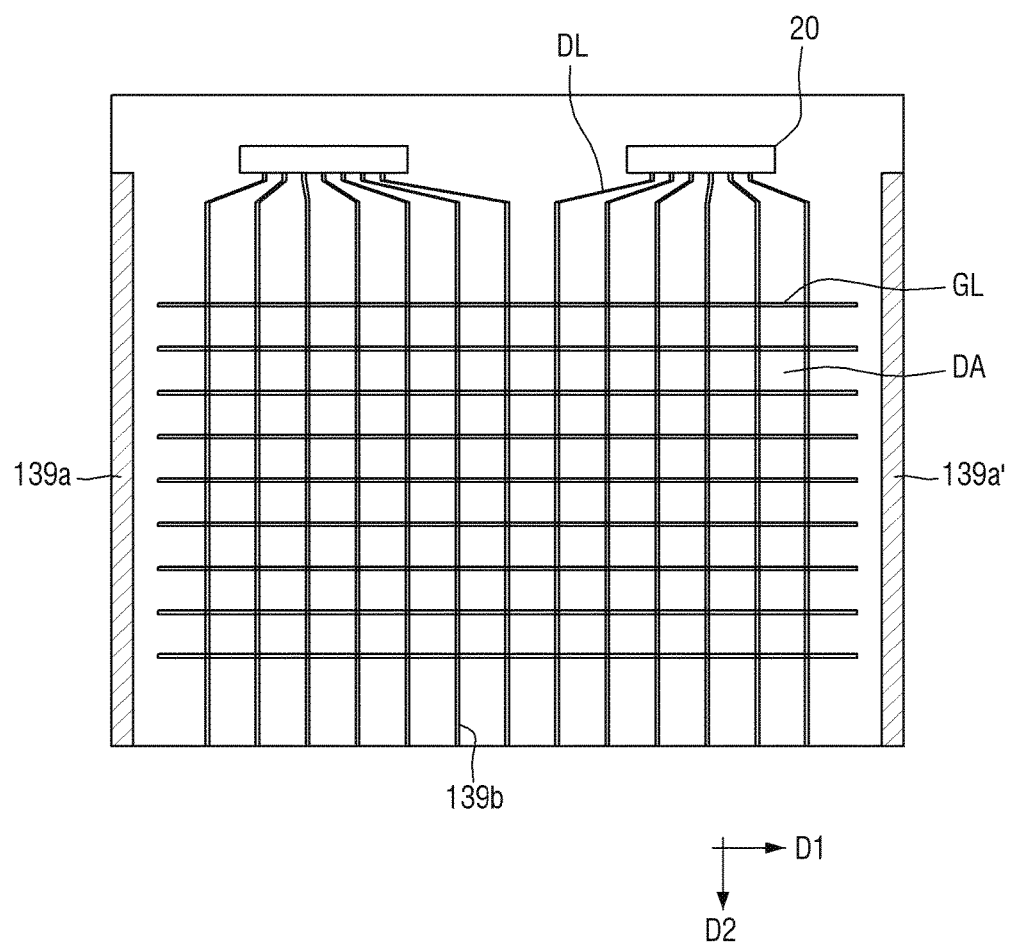
FIG. 8 is a simplified diagram illustrating a first substrate of the liquid crystal display according to another embodiment of the present inventive concept.

FIG. 8 is a schematic circuit diagram of a first substrate of the liquid crystal display according to still another embodiment of the present inventive concept.

According to FIG. 8, data lines DL are formed on the display area DA. Since the data line DL serves to transmit data signals to each pixel located on the display area, it does not need to extend to the non-display area NDA. However, if there are opaque wirings such as the data lines (DL) in the sealing area SA, it is easy to detect defects in the sealing area SA due to light reflection on the surface of the data line (DL).

Thus, as in FIG. 8, the data lines (DL) may extend to the fourth region 13 of the non-display area NDA. An extended portion may be referred to as a third dummy wiring 139b. Furthermore, the gate line GL may not be disposed on the first area 10 and the third region 12. Therefore, as illustrated in FIG. 8, a first dummy wiring 139a and a second dummy wiring 139a' may be further included in the first area 10 and the third region 12, respectively. The first dummy wiring 139a, the second dummy wiring 139a' and the third dummy wires 139b may be formed of the same material through the same manufacturing process as the data lines (DL) or may be formed of the same material through the same manufacturing process as the gate line (GL).

The first dummy wiring 139a and the second dummy wiring 139a' have a tubular plate shape, and may be disposed in the first region 10 and the third region 12 to have the same width as the width of the sealing area SA.

Figure 9:
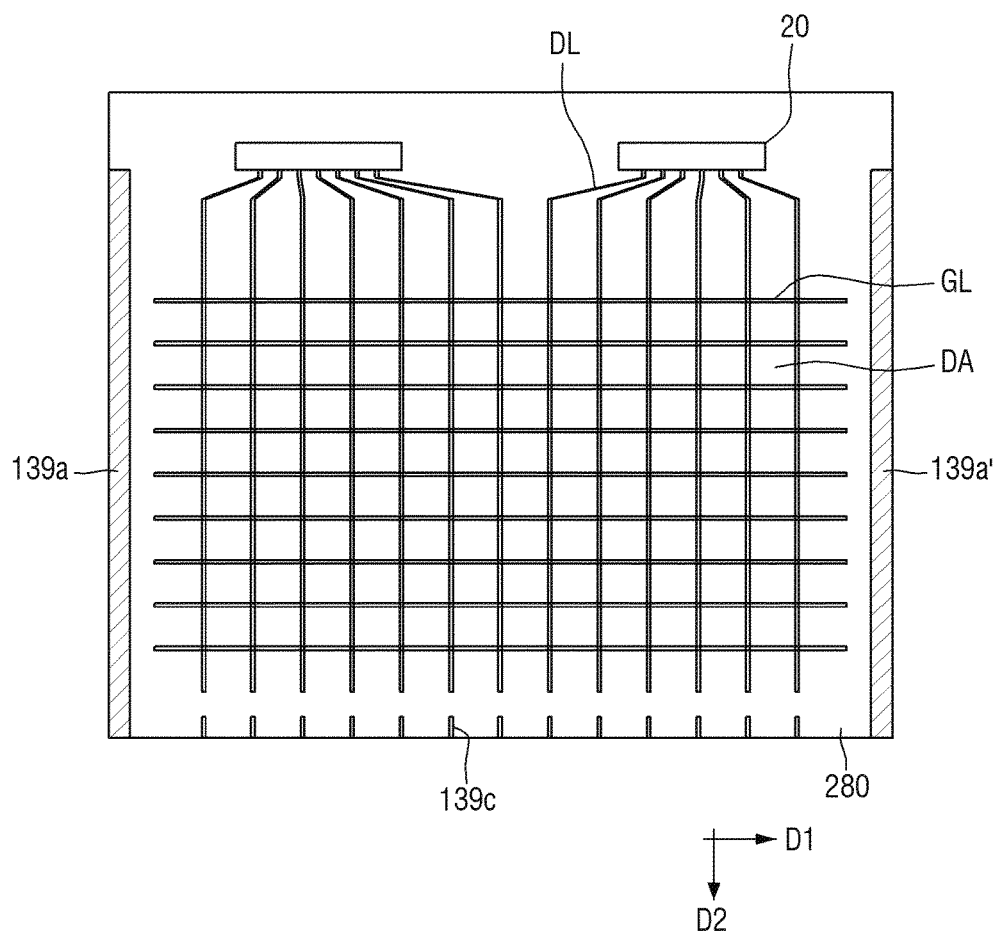
FIG. 9 is a simplified diagram illustrating a first substrate of the liquid crystal display according to another embodiment of the present inventive concept.

FIG. 9 is a schematic wiring diagram of a first substrate of the liquid crystal display according to still another embodiment of the present inventive concept.

The fourth dummy wiring 139c may be disposed in a direction extending from a direction D2 to which the data lines (DL) are directed. The fourth dummy wiring 139c may be spaced apart from the data line (DL) to which the data signal is actually applied. The fourth dummy wiring 139c may have a width of the sealing area SA. The fourth dummy wiring 139c may have a disconnected portion at the boundary between the display area DA and the non-display area NDA.

Figure 10:
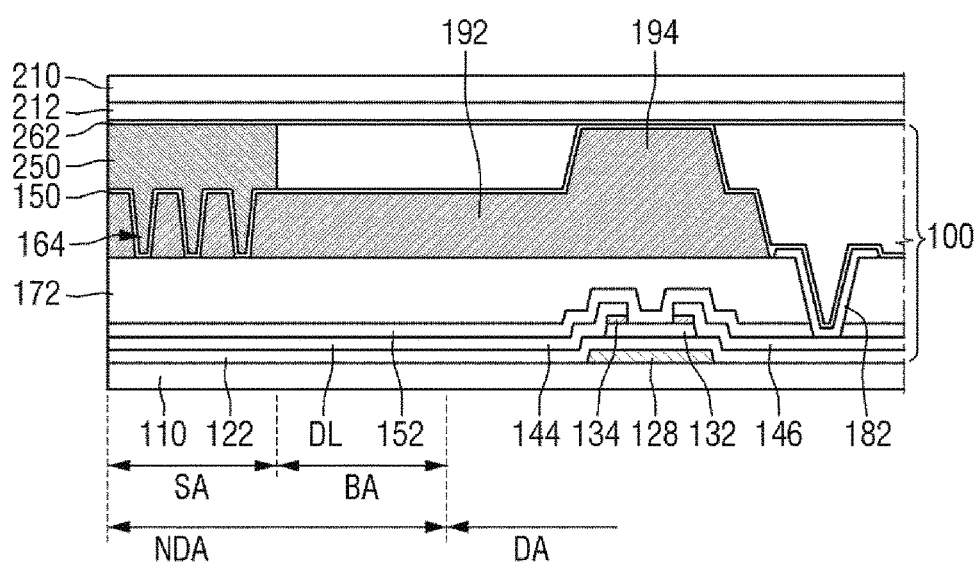
FIG. 10 is a schematic cross-sectional view of a liquid crystal display according to still another embodiment of the present inventive concept.
Figure 11:
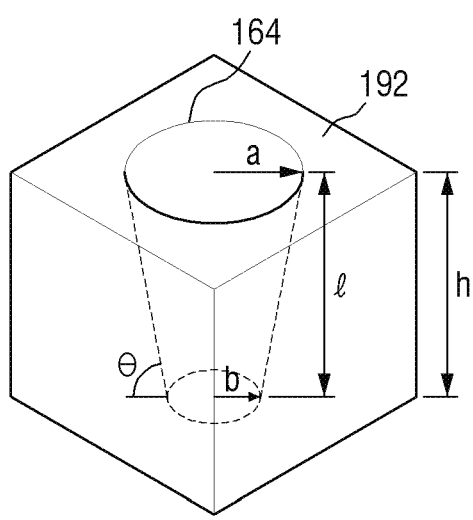
FIG. 11 is a perspective view separately illustrating only a fifth opening 164 of the embodiment of FIG. 10.

FIG. 10 is a schematic cross-sectional view of a liquid crystal display according to still another embodiment of the present inventive concept, and FIG. 11 is a perspective view separately illustrating only the fifth opening 164.

The structure and shape of the fifth opening 164 will be described referring to FIGS. 10 and 11. The fifth opening 164 has a shape with different vertical widths, unlike the first to fourth openings 160 to 163. Thus, an upper portion of the fifth opening 164 has a radius a, but a lower portion thereof has a radius b, and 'a' is a value greater than 'b'. Since the fifth opening 164 has an inclined surface unlike the first to fourth openings 160 to 163, when applying the sealing member 250 later, the sealing member 250 is easily introduced along the inclined surface of the fifth opening 164. Since the bonding force becomes stronger in proportion to bonding area of the sealing member 250, the fifth opening 164 has an advantage of having excellent bonding force after the sealing member 250 is bonded to the second substrate 200. Moreover, an area exposed to the UV beam also becomes wider during the process of curing after the sealing member 250 is introduced into the fifth opening 164, which is also advantageous for curing of the sealing member 250.

In addition, since the fifth opening 164 has an inclined surface, it is possible to detect the light reflected on the inclined surface of the fifth opening 164 when using the sealing inspection method to be described later. Thus, if the fifth opening 164 and the opening have the inclined surface, since the direction of emitting the light source at the time of sealing inspection may be different from the direction of measuring the reflected light, there is a practical advantage.

In the embodiment, θ may be 45 degrees or more and 75 degrees or less. To form the opening such as the fifth opening 164 on the light-shielding pattern 164, it may be necessary to perform the partial development using a semi-transparent mask, which will be apparent to those skilled in the art.

Figure 12:
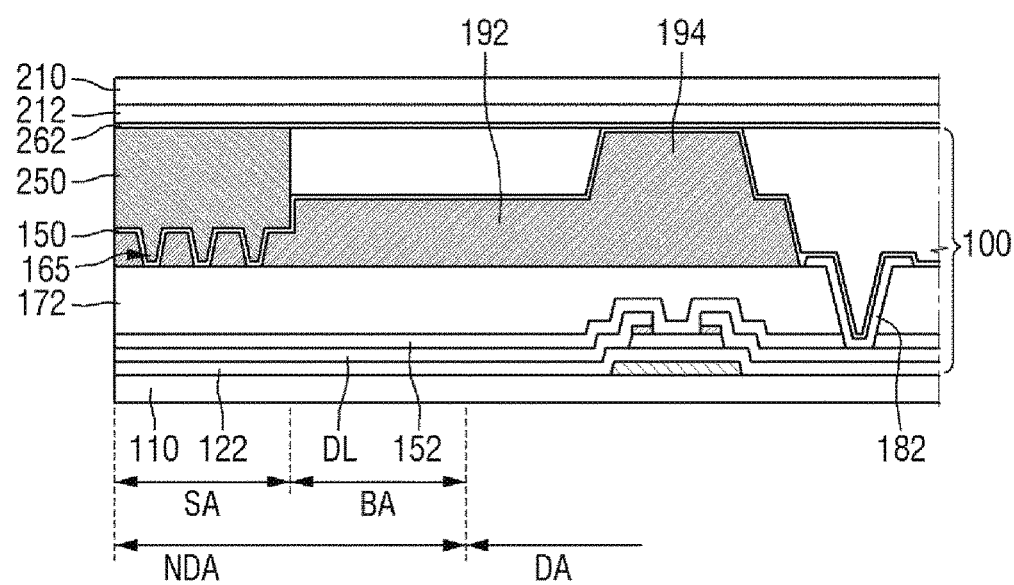
FIG. 12 is a schematic cross-sectional view of a liquid crystal display according to still another embodiment of the present inventive concept.
Figure 13:
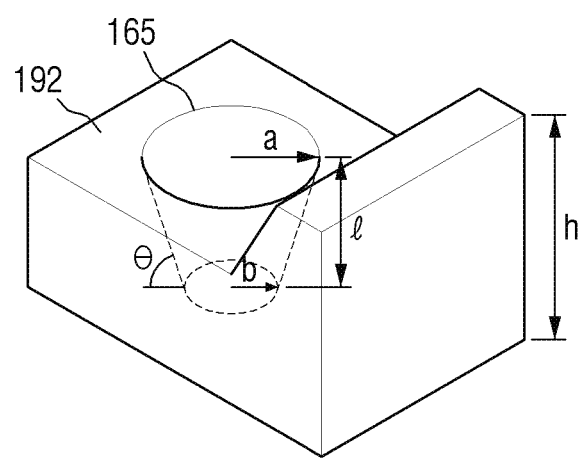
FIG. 13 is a perspective view separately illustrating only a sixth opening 165 according to the embodiment of FIG. 12.

FIG. 12 is a schematic cross-sectional view of a liquid crystal display according to still another embodiment of the present inventive concept, and FIG. 13 is a perspective view separately illustrating only the sixth opening 165 of FIG. 12.

The sixth opening 165 may have a shape which has an inclined surface and has a narrowed width as it goes downward, similarly to the fifth opening. However, the height of the light-shielding pattern 192 in the formation region of the sixth opening 165 is thinner than the non-formation regions of the sixth opening 165. Although the openings are formed in the thickness direction of the light-shielding pattern 192, the light-shielding pattern 192 is not disposed in the formation portion of the opening, and the portion is filled with the sealing member 250. When the thickness of the light-shielding pattern 192 is thin, the time taken to form the opening is also short, and the sealing member 250 is also easily filled later. Further, the light reflected by the lower surface of the opening is used at the time of the sealing inspection, and since a path in which the reflected light rises is reduced, there is also an advantage to detect the reflected light.

Figure 14:
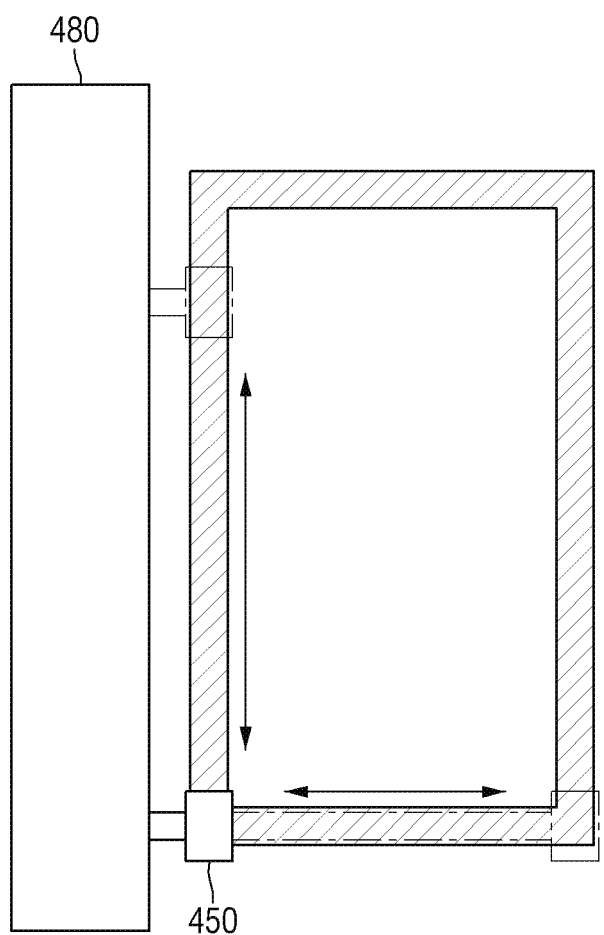
FIGS. 14, 15, 16, 17, 18, 19, 20 and 21 are diagrams illustrating a sealing inspection process in the manufacturing process of the liquid crystal display according to some embodiments of the present inventive concept.

The height of the sixth opening 165 is smaller than the thickness of the light-shielding pattern 192. Thus, the light-shielding pattern 192 may have an inclined surface at a boundary between the sealing area SA and the light shielding area BA. The inclined surface of the light-shielding pattern 192 may also serve as a dam which prevents the alignment film 150 from being introduced to the sealing area SA when forming the alignment film 150. The reason is that since the alignment film 150 inhibits the adhesion between the sealing member 250 and the light shielding pattern 192 and the organic layer 172, the alignment film 150 is not desirably disposed on the sealing area SA which is a part of the non-display area NDA FIGS. 14, 15 and 16 are diagrams for explaining a method for inspecting the sealing area SA using a sealing inspection device during the manufacturing process of the liquid crystal display of the present inventive concept.

The liquid crystal display according to an embodiment of the present inventive concept may integrally form the light-shielding pattern 192 and the column spacer 194 on the first substrate 100. After applying the constituents of the light-shielding pattern 192, by performing the exposure, the light-shielding pattern 192 may be formed. Thereafter, after forming the sealing member 250 to the sealing area SA, the sealing inspection is performed. The sealing inspection is performed, as the sealing inspection device moves in the sealing area SA of the first substrate 100 as illustrated in FIG. 15. If the sealing member 250 is determined to be abnormally applied, a repair process may be further included.

Figure 15:
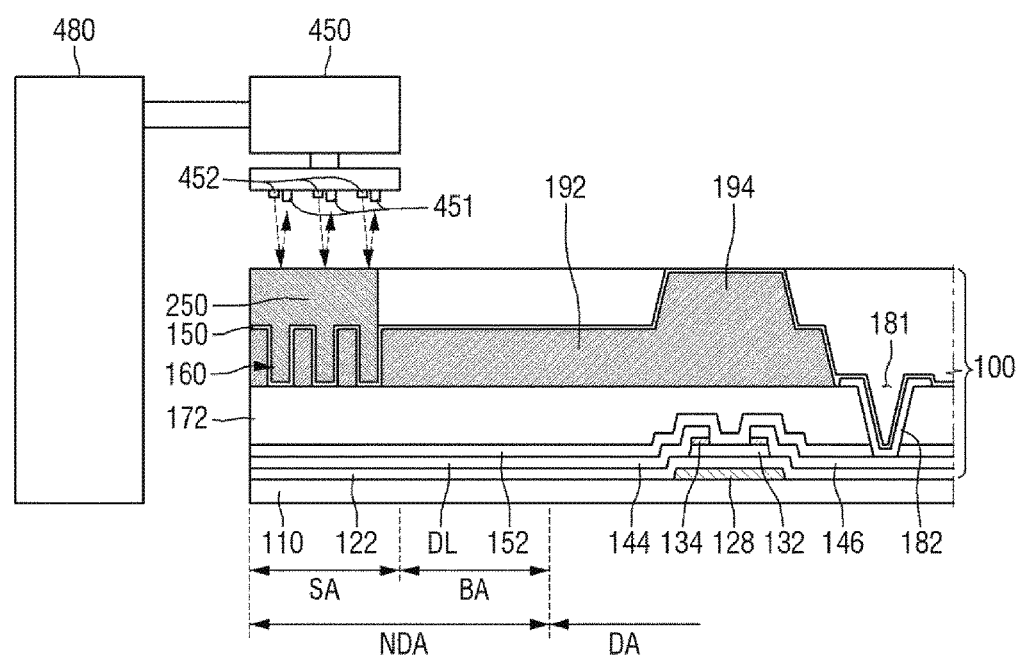
Figure 16:
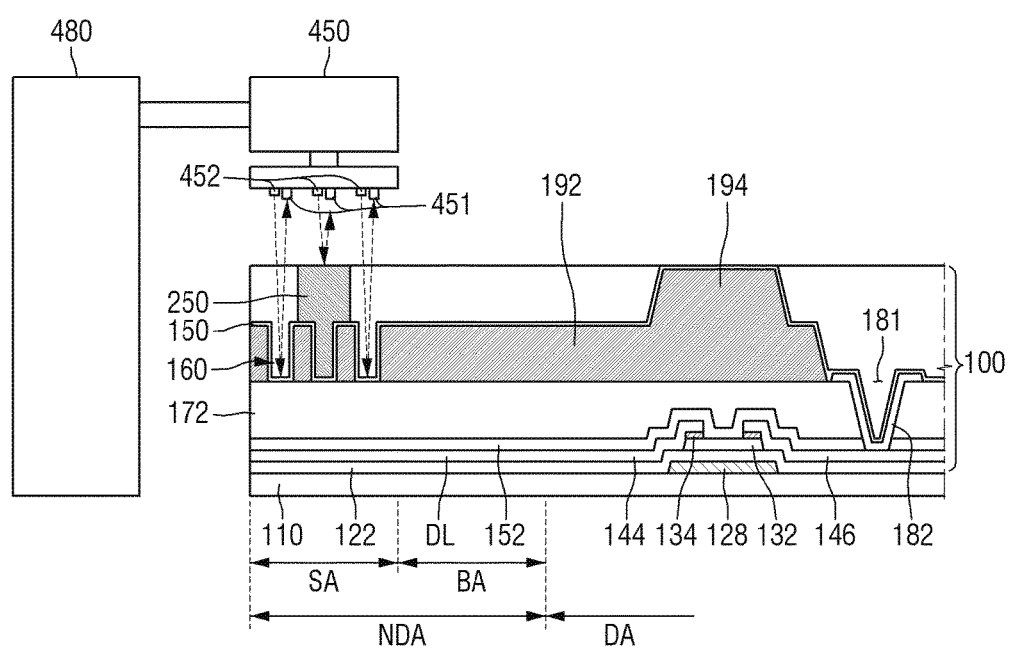

The repair process may also be performed after finishing all the sealing inspection, but in the local sealing inspection as illustrated in FIG. 15, when the sealing application is determined to be abnormal, the repair may be performed by the method of additionally applying the sealing member 250 on the sealing area SA having abnormal portion.

In the sealing inspection device, a support unit 480 is disposed on one side surface of the first substrate 100, a sealing inspection unit 450 is connected to the support unit 480 through a long bar, the length of the bar may change, and the bar may laterally move and may vertically and horizontally move. Thus, the sealing inspection device may perform the sealing inspection, while moving on the top of the fixed first substrate 100.

FIGS. 14 and 15 is a diagram illustrating a sealing inspection method according to an embodiment of the present inventive concept. Referring to FIGS. 14 and 15, the sealing inspection unit 450 connected to the support unit 480 is disposed in a vertically upper portion of the sealing area SA. A light source 452 is disposed on one side on which the sealing inspection unit 450 faces the sealing area SA, and a measuring device 451 is disposed beside the light source 452. The light source 452 emits light toward the sealing area SA. The measuring device 451 determines whether the light emitted from the light source 452 is reflected. The sealing inspection device determines that the sealing area SA is normally applied with the sealing member 250, when only light reflected by the surface of the sealing member 250 is detected or the reflected light is not detected at all. Since FIG. 15 is in a state in which the sealing member 250 is normally applied, only the light reflected by the surface of the sealing member 250 is measured, or the reflected light is not detected. Thus, the sealing inspection device determines that the sealing member 250 is normally applied in the case of FIG. 15.

Meanwhile, in FIG. 16, the first opening 160 exposes the organic layer 172. Thus, in the case of FIG. 16, the sealing inspection device may measure light reflected by the alignment film 150 disposed on the first opening 160 and its lower film, as well as light reflected by the sealing member 250. At this time, the sealing inspection device will determine that the sealing area SA is abnormal.

Since the sealing member 250 of the present inventive concept includes the black pigment, an amount of absorbing the light is smaller than an amount of reflecting the light. Meanwhile, the first opening 160 exposes the alignment film 150 and the organic layer 172, and the alignment film 150 and the organic layer 172 are transparent materials and have a degree of reflection of light greater than that of the black material. Thus, the sealing inspection device may measure the intensity of the reflected light and may determine whether light determined by the measuring device 451 is light reflected by the sealing member 250 or light reflected by the first opening 160.

Figure 17:
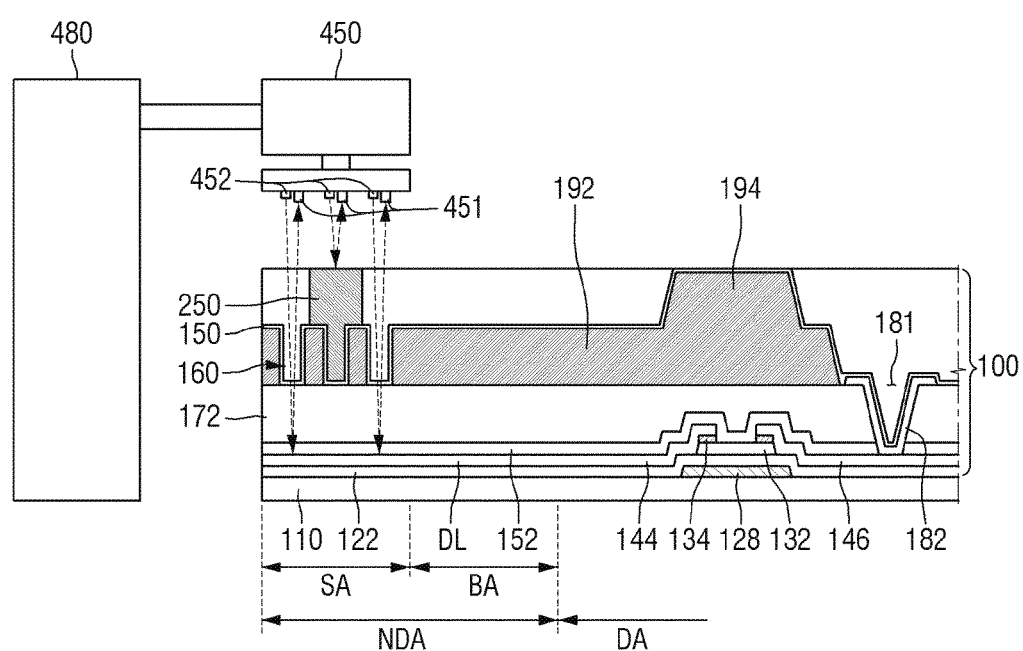
Figure 18:
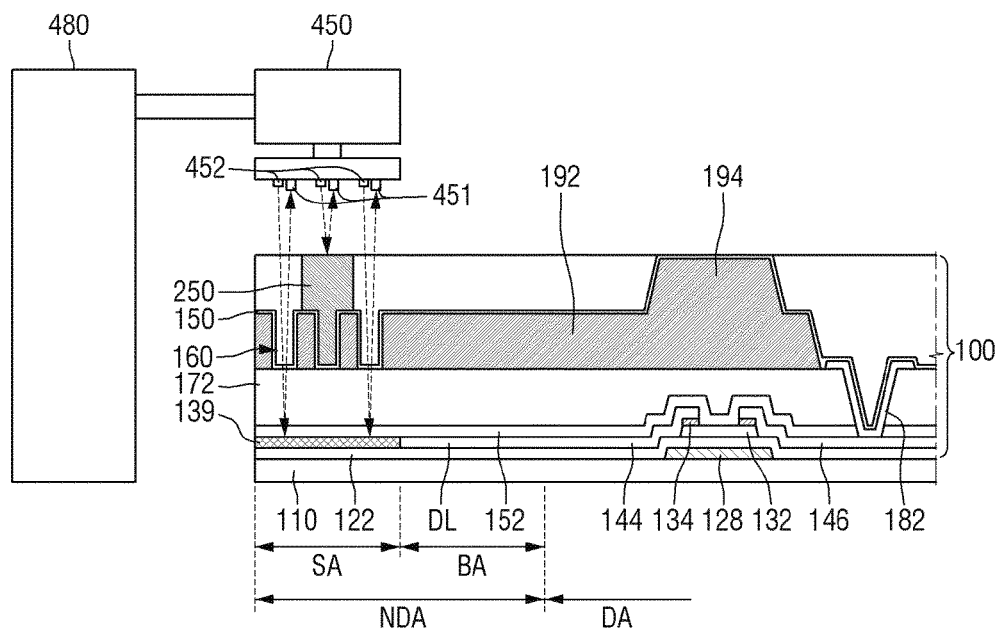

However, since the alignment film 150 and the organic layer 172 are the transparent materials, the reflectivity is not too large. Therefore, to more precisely inspect whether the sealing member 250 is normally applied, as illustrated in FIG. 17 and FIG. 18, a method of measuring the light reflected by the data line DL and the gate line GL will be described.

Since the materials constituting the data line DL and the gate line GL are opaque metals, such as aluminum-based metal such as aluminum (Al) and aluminum alloy, silver-based metal such as silver (Ag) and silver alloy, copper-based metal such as copper (Cu) and copper alloy, molybdenum-based metal such as molybdenum (Mo) and molybdenum alloy, chromium (Cr), titanium (Ti) and tantalum (Ta), their reflectivity is much higher than that of the alignment film 150, the organic layer 172 and the protective layer 152. Therefore, since the reflectivity of the light reflected by the data line DL and the gate line GL is much higher than that of the light reflected by the sealing member 250, it is easy to distinguish between the normal case and the abnormal case of the sealing member 250. Since the alignment film 150, the organic layer 172 and the protective layer 152 are transparent, they expose the data line DL and the gate line GL located below them. Thus, the light emitted from the light source 452 of the sealing inspection device may reach the data line DL and the gate line GL.

However, as described above, in the sealing member 250 disposed on the non-display area NDA, a region in which the data line DL and the gate line GL are not disposed may exist. Thus, for sealing inspection, a dummy wiring 139a, 139a', 139b and/or 139C may be further locally included in the first region 10 to the fourth region 12 of the first substrate 100.

Since the dummy wiring 139 may be formed of the same material as the data line DL and the gate line GL by the same process, the principles of the sealing inspection method are identical to those described above.

Figure 19:
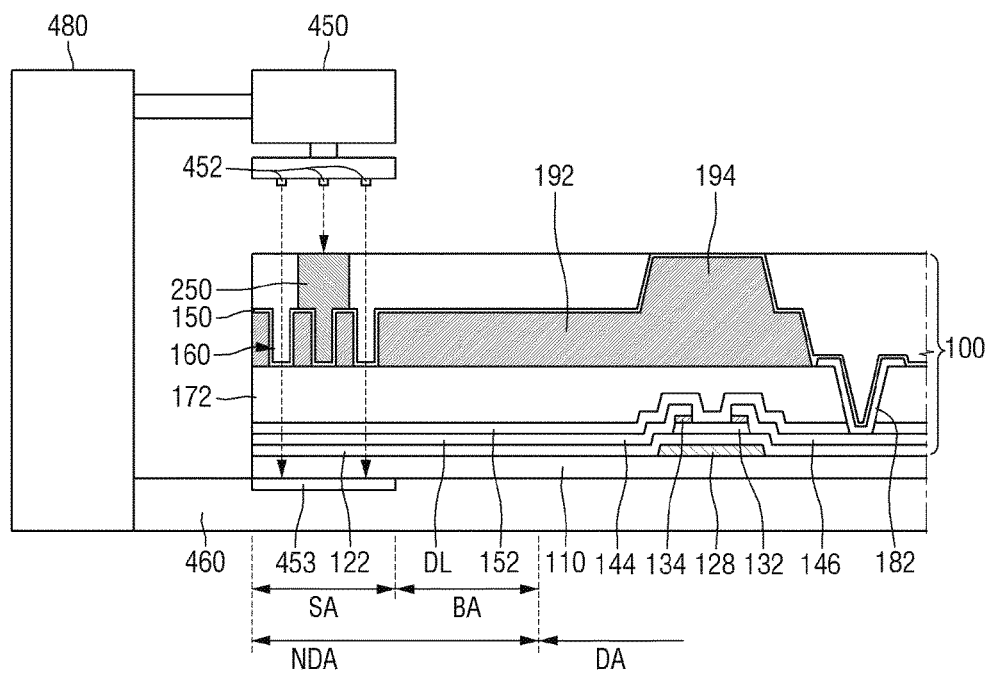

FIG. 19 is a sealing inspection method according to another embodiment of the present inventive concept. Referring to FIG. 19, a measuring device 453 may be disposed on the sealing area SA below the first substrate 100. Light emitted from the light source 452 may reach the measuring device 453 through the first opening 160, as long as the sealing member 250 does not bury the interior of the first opening 160.

The measuring device 453 may be mounted within a substrate support 460, and the sealing inspection may be performed by disposing the first substrate 100 on the substrate support 460.

However, the sealing inspection method according to FIG. 19 is not suitable for the second region 11 which is a sealing area SA in which the data line DL is located. The reason is that the data line DL is an opaque metal, and thus, it reflects light rather than transmitting light. Thus, the sealing inspection method according to FIG. 19 is suitable for the first region 10, the third region 12 and the fourth region 13 in which the gate line GL and the data line DL are not located. In addition, the sealing inspection method according to FIG. 19 may enhance the accuracy compared to other sealing inspection methods. That is to say, when a number of light beams reflected between the openings are measured in the case of reflection, it is difficult to determine whether the sealing member 250 of which area is abnormally applied. The reason is that a plurality of openings is formed, and thus, the light reflected by the adjacent openings is also measured. However, in the case of transmission, the mixing is difficult, and there is an advantage that the sealing member 250 can exactly found the abnormally applied region.

Figure 20:
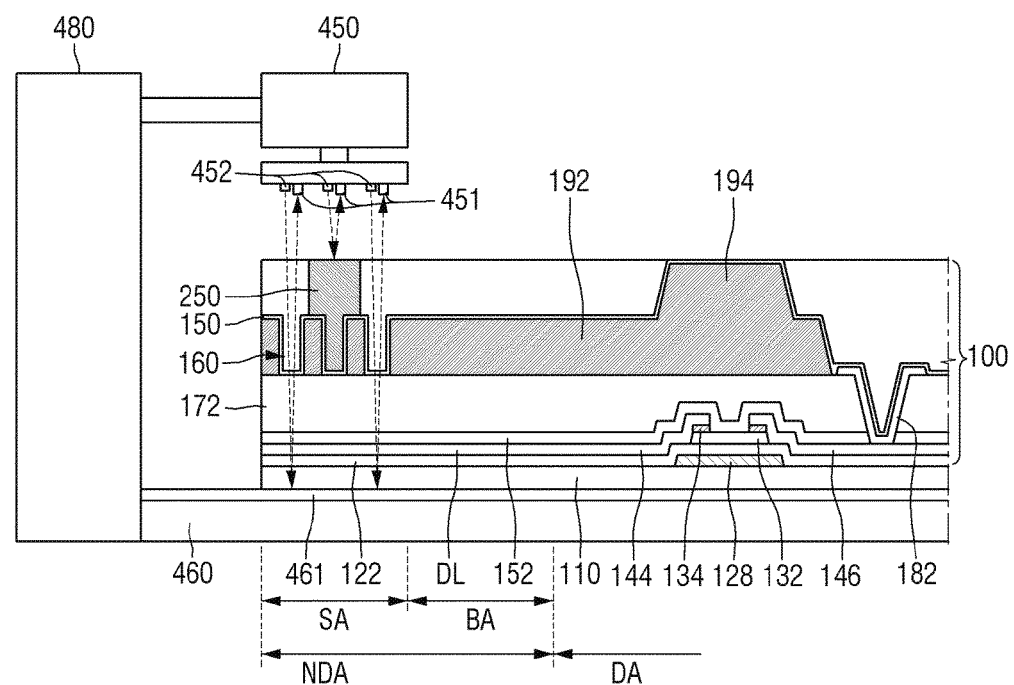

FIG. 20 is a diagram that schematically illustrates a sealing inspection method according to still another embodiment of the present inventive concept.

The sealing inspection device may further include a reflector 461. Therefore, since the data line DL and the gate line GL do not pass, a dummy wiring 139a, 139a', 139b and 139c is not needed, and the sealing inspection may be performed by including the reflector 461 in sealing inspection device.

If the dummy wiring 139a, 139a', 139b and 139c is intended for the sealing inspection, it may be difficult to form the dummy wiring 139a, 139a', 139b and 139c only in the sealing area SA in a narrow bezel type liquid crystal display. Therefore, when the reflector 461 is disposed below the first substrate 100, the sealing inspection may be performed even without using the dummy wiring 139.

Figure 21:
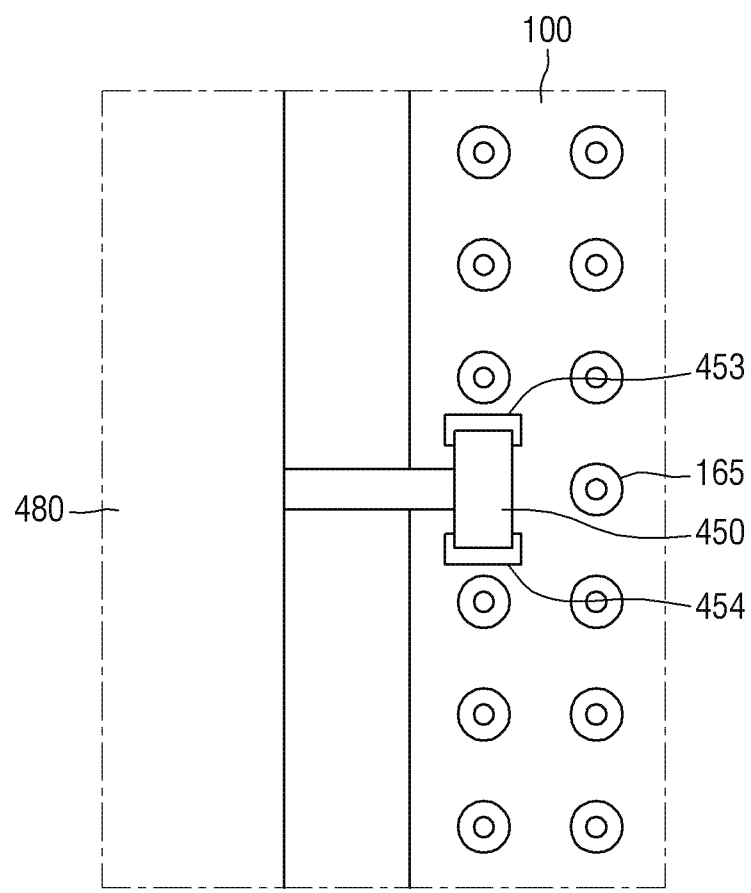

FIG. 21 is a diagram illustrating a method of performing sealing inspection on the liquid crystal display according to FIGS. 10 and 12.

In the case of the liquid crystal display according to FIGS. 10 and 12, the fifth opening 164 and the sixth opening 165 include an inclined surface. Therefore, the light source 453 may be disposed in a first direction, and the measuring unit 454 may be disposed on the opposite side to the inspection device 450. Light emitted from the light source 453 may be reflected by the inclined surfaces of the fifth opening 164 and the sixth opening 165, and the reflected light may be detected by the measuring unit 454 which is located on an opposite side to the light source 453. When separating the light source 453 and the measuring unit 454 from each other, it is easy to measure the light. In particular, since the areas of the openings are very narrow, and when separating the light source 453 and the measuring unit 454 from each other as illustrated in FIG. 21 rather than disposing both of the light source 453 and the measuring unit in the same direction over the openings, there are various advantages when manufacturing the sealing inspection device.

While the present inventive concept has been particularly illustrated and described with reference to exemplary embodiments thereof, it will be understood by those of ordinary skill in the art that various changes in form and detail may be made therein without departing from the spirit and scope of the present inventive concept as defined by the following claims. The exemplary embodiments should be considered in a descriptive sense only and not for purposes of limitation.

What is claimed is:

1. A display device comprising:
    a substrate which comprises a display area and a non-display area; and
    a sealing member which is disposed on the substrate and overlaps the non-display area
    wherein the substrate comprises:
    an organic layer;
    a protrusion pattern which is protruded from the organic layer; and
    an opening which is disposed in the organic layer, and overlapping the sealing member, and
    wherein the opening does not overlap with the protrusion pattern,
    wherein the non-display area comprises a first area in which the sealing member is not disposed, and a second area which is disposed between the first area and the display area, and the opening is disposed in the second area.

2. The display device of claim 1, wherein the opening extends in a thickness direction of the organic layer, and a depth of the opening is the same as a thickness of the organic layer.

3. The display device of claim 1, wherein the second area has a shape of a closed curve.

4. The display device of claim 3, wherein the opening includes a plurality of openings which have a regularly spaced interval.

5. The display device of claim 4, wherein the openings have a same shape and a same size.

6. The display device of claim 3, wherein the organic layer overlapping the second area has a thickness thinner than that of the organic layer disposed in the first area.

7. The display device of claim 6, wherein the organic layer has an inclined surface between the second area and the first area.

8. The display device of claim 1, wherein the interior of the opening is completely filled by the sealing member.

9. The display device of claim 1, wherein a dummy wiring is further included at the bottom of the organic layer disposed on the sealing area.

10. The display device of claim 9, wherein the dummy wiring is formed by extension of wirings disposed on the display area.

11. The display device of claim 9, wherein, the wiring of the dummy wiring disposed on the display area has a disconnected portion at a boundary between the display area and the non-display area.

12. The display device of claim 1, wherein an upper portion of the opening is wider than a lower portion of the opening and the opening has an inclined surface between the upper portion and the lower portion.

13. A display device comprising:
    a substrate which comprises a display area and a non-display area; and
    a sealing member which is disposed on the substrate and overlaps the non-display area; wherein the first substrate comprises:
    an organic layer;
    a protrusion pattern which is protruded from the organic layer; and
    an opening which is disposed in the organic layer, and overlapping the sealing member, and wherein the opening comprises at least one or more openings having shapes different from each other.

14. The display device of claim 1, wherein the height of the sealing member is higher than the height of the protrusion pattern.

15. The display device of claim 1, wherein the organic layer, the protrusion pattern and the sealing member are made of a black material.

16. The display device of claim 1, wherein the organic layer and the protrusion pattern are photosensitive materials and formed of a same material through a same process, and the sealing member is made of a non-photosensitive material.

* * * * *